(12) United States Patent
Michie et al.

(10) Patent No.: US 9,787,749 B2
(45) Date of Patent: Oct. 10, 2017

(54) METHOD, APPARATUS, AND SYSTEM FOR PROVIDING AND USING MULTI-PROTOCOL EVENTING

(71) Applicant: Avaya Inc., Basking Ridge, NJ (US)

(72) Inventors: Kenneth O. Michie, Thornton, CO (US); Gordon R. Brunson, Broomfield, CO (US); Robert E. Braudes, Erie, CO (US); Kurt Haserodt, Westminster, CO (US); Hyoungjoo Lee, Highlands Ranch, CO (US)

(73) Assignee: Avaya Inc., Basking Ridge, NJ (US)

( * ) Notice: Subject to any disclaimer, the term of this patent is extended or adjusted under 35 U.S.C. 154(b) by 260 days.

(21) Appl. No.: 13/841,445

(22) Filed: Mar. 15, 2013

(65) Prior Publication Data

US 2014/0282619 A1 Sep. 18, 2014

(51) Int. Cl.
| | | |
|---|---|---|
| *G06F 3/00* | (2006.01) | |
| *G06F 9/44* | (2006.01) | |
| *G06F 9/46* | (2006.01) | |
| *G06F 13/00* | (2006.01) | |
| *H04L 29/08* | (2006.01) | |
| *H04L 29/14* | (2006.01) | |
| *G06F 17/30* | (2006.01) | |

(52) U.S. Cl.
CPC ........ *H04L 67/02* (2013.01); *G06F 17/30345* (2013.01); *H04L 67/1004* (2013.01); *H04L 69/40* (2013.01)

(58) Field of Classification Search
None
See application file for complete search history.

(56) References Cited

U.S. PATENT DOCUMENTS

| | | | |
|---|---|---|---|
| 7,600,046 B2* | 10/2009 | Whittle et al. | ................. 709/248 |
| 7,735,119 B2* | 6/2010 | Manfredi et al. | .................. 726/4 |
| 7,774,791 B1* | 8/2010 | Appelbaum | ........... G06Q 10/06 |
| | | | 705/1.1 |
| 7,900,200 B1* | 3/2011 | Violleau et al. | ............... 717/167 |
| 2004/0158549 A1* | 8/2004 | Matena et al. | .................... 707/1 |
| 2006/0101146 A1 | 5/2006 | Wang | |
| 2006/0178918 A1* | 8/2006 | Mikurak | ................ G06Q 10/06 |
| | | | 705/7.25 |
| 2009/0201917 A1* | 8/2009 | Maes et al. | .................... 370/352 |
| 2011/0321011 A1* | 12/2011 | Selitser | .................... H04L 67/02 |
| | | | 717/120 |
| 2013/0151453 A1* | 6/2013 | Bhanot et al. | ................... 706/46 |
| 2013/0232482 A1* | 9/2013 | Hassan | ..................... G06F 8/61 |
| | | | 717/178 |
| 2014/0129661 A1* | 5/2014 | Thyagaraja | .................... 709/207 |

\* cited by examiner

*Primary Examiner* — Tuan Dao
*Assistant Examiner* — William C Wood
(74) *Attorney, Agent, or Firm* — Sheridan Ross P.C.

(57) ABSTRACT

Methods and systems for providing an elegant and efficient multi-protocol eventing layer are disclosed. The multi-protocol eventing layer includes a converged container capable of handling multiple types of protocols to manage events while using an open source database. Accordingly, the multi-protocol eventing layer efficiently provides real-time or near real-time eventing to a plurality of devices for scalability and performance enhancement.

20 Claims, 8 Drawing Sheets

METHOD, APPARATUS, AND SYSTEM FOR PROVIDING AND USING MULTI-PROTOCOL EVENTING

FIELD OF THE DISCLOSURE

The present disclosure is generally directed to enterprise eventing.

BACKGROUND

Networks keep track of events that occur for a variety of collaborative network devices. The network typically uses a computer to gather and share information with other computers, network devices, and applications. There are many programs the network can use to manage network elements, including applications that are capable of polling elements for status, capturing traps and error messages, providing reports, and performing a variety of other duties. Polling is a common, if not particularly efficient way to ask for status from an element. Polling asks network elements, "Are you there? Are you ok?" Processor resources are consumed as polling asks for status of each network element until it answers or times out, oblivious of the actual state of the network element. As polling takes up processor resources, it can only ask a limited number of network elements for status. Because of polling limitations, more efficient strategies like eventing are being explored.

Eventing is the term used for the gathering and/or sharing of information between network elements through the use of notifications. Event tracking is a way of managing the notifications that come into a central location from network elements, and using information in the notifications to make changes, corrections, and updates to the network and network elements. Event tracking allows the network to monitor and manage network elements based on activity within the network, removing the inefficiencies of polling.

A variety of activities may be monitored and managed through eventing. Events may include system information and status, log entries for transactions and subscriptions, data updates, errors and error codes, failures, and other relevant data. There can be special requirements for eventing, depending on the network elements involved. The requirements can be based on the type of protocol needed to communicate and how the network element provides information. Additional requirements might include how to handle real-time, near-real time, and historic notifications and communication.

The network may manage events from a communication server or computer. The ability to correlate, consolidate, and react to events as they occur directly impacts management efficiency. Some networks have started using open source databases as they are fast and scalable. However, many popular open source databases (e.g., Cassandra) don't natively support eventing, meaning that the databases are unable to provide eventing without extra help. Most open source databases also lack multi-protocol support (e.g., Session Initiation Protocol-SIP, Hypertext Transfer Protocol-HTTP, Lightweight Directory Access Protocol-LDAP). Multi-protocol support is required by many network products to communicate with many different types of network elements.

Lack of native support with open source databases can be addressed with a variety of strategies including polling, busy-wait, interrupt-driven I/O or interrupt requests (IRQs), and web service eventing. Polling is the typical low-level check previously described. Busy-wait checks the status of a network element until it is ready to communicate, at which point the network element provides status. As with polling, processor resources are wasted when network elements provide no response or slow response. IRQs ask the network element to stop what it is doing to give status once. The way in which IRQs halt operations and only ask once is not efficient. Internet Protocol (IP) addressing also has to be done carefully to avoid conflicts and errors. Web service eventing is intended to provide more efficient and reliable message delivery than the strategies previously listed. However, web eventing has limitations for large deployments since notification paths must be set up manually. Web eventing is unable to provide IP multicast, lacks the ability for recipients to forward messages to others, and lacks end-to-end security and Quality of Service (QoS) guarantees.

A remote collaborative network device using a protocol like SIP may not communicate effectively unless the protocol has an open channel and is active through firewalls, routers, and session border controllers (SBCs). An open channel may be used to deliver notifications of changed data to keep collaborative network devices in synchronization. Allowing only a single protocol to be used as the only way to manipulate data is inefficient for adjacent servers who may use RESTful access methods without concerns about firewall, router, and SBC blockages.

More efficient and less expensive strategies are needed for security, reliability, and accessibility for networks that have network elements and collaborative network devices requiring multi-protocol support for both stateful and evented information.

A strategy that provides robust and consistent universal access for all network elements and devices with eventing for a Cassandra or other open-source database including the ability to manage multiple protocols is desired. Additional features and advantages of embodiments of the present invention will become more readily apparent from the following description, particularly when taken together with the accompanying drawings.

SUMMARY

It is with respect to the above issues and other problems that the embodiments presented herein were contemplated. In particular, embodiments of the present disclosure propose the ability to, among other things, provide a method, apparatus, and system to execute a scalable, multi-protocol eventing layer for enterprise use with open source databases. Event notification provided by the eventing layer is used to monitor and to respond to modification requests, independent of protocol or network size.

In accordance with at least some embodiments of the present disclosure, the eventing layer is developed and is operable to front-end a database, such as a No Structured Query Language (NoSQL) database. The Cassandra database is one type of an open-source NoSQL database used by many companies and is fault tolerant, durable, scalable, and decentralized. However, the Cassandra database only responds to polling queries from a limited number of database connected clients. The changing information stored in the database needs a way to proactively reach all interested consumers of the changed information without requiring substantial changes to the available networking protocols of the device hosting the client.

The Avaya Aura® User Store's User Information Service Multi-Protocol Eventing is an elegant and efficient mechanism that operates at the application programming interface (API) level to support the Cassandra database. The User Information Service typically receives SIP and/or HTTP API requests to access contacts, contact lists, presence access control lists, communication logs, and other user-specific data.

The multi-protocol eventing layer, in some embodiments, monitors change requests over the User Information Service API. In the User Information Service, protocols are supported by the API rather than by the database. A converged common container for HTTP and SIP API servlets efficiently manages data and updates. The API implementation contains an eventing layer that front-ends Cassandra which minimizes the window of time where data has been changed but is not yet seen as changed by the clients. When the requested changes (e.g., creation of new data, update of existing data, or deletion of existing data) are applied to the database, a notification event is generated and sent to the User Information Service clients that have subscribed to receive the events, via SIP, HTTP, or other protocols.

Systems implementing embodiments of the present disclosure can provide the functions provided by the User Information Service through one or more modules, one or more communication servers, and across one or more networks. An event state compositor (e.g., communication server) may be configured to handle new event packages, and filtering of subscription requests limits the amount of data being actively monitored.

Although embodiments of the present disclosure will be primarily described in connection with communication services or communication systems, it should be appreciated that "services" as used herein can include any type of feature or feature set that is made available to a user or group of users either within a single enterprise or within multiple enterprises. Non-limiting examples of services include communication services (e.g., call routing services, call-enhancing features, conferencing services, security/encryption services, firewall services, multimedia communication services, collaboration services, etc.), HTTP-type services (e.g., web-browsing services, web-collaboration services, etc.), media services, data storage services, and any other service that can be supported or provided by a communication server or collection of servers that provide users or client devices with content or features to enhance operations of the client device or systems exposed to the client device.

The terms and phrases "events," "event notification," and "eventing" as used herein refer to one or more actions that are initiated either within or outside the scope of a program and are handled by a piece of code inside the program. Typically events are handled synchronous with program flow, meaning the program has one or more places where events are handled. A computer program that changes its behavior in response to events is said to be event-driven. Eventing is used to inform applications when watched-for conditions occur.

The term "polling" as used herein refers to actively sampling the status of an external device by a client program as a synchronous activity.

The term "User Information Service" as used herein refers to a scalable database service that contains data provisioned by or on behalf of a user. The User Information Service receives SIP, HTTP, or other protocol requests to access Contacts, Contact Lists, Presence Access Control Lists, Communication Logs, and other user-specific data. This information is shared across multiple applications, including HTTP, SIP, or other protocol-enabled applications on clients, web applications, and communication applications. The SIP subscriptions persist, allowing the operation of other servers and clients to extend the availability of user-specific data.

The phrase "open source" as used herein refers to a philosophy that promotes free distribution and access to a software product's programming and implementation details.

The term "schema" as used herein should be understood to refer to a framework or set of rules for the organization and validation of stored data. Schema may have rules that are predefined and/or user defined. The schema, in some embodiments, sets boundaries and parameters, possibly defining objects in a database structure.

The term "state" as used herein refers to the condition of a device, which may include but is not limited to active, disabled, offline, alarming, initializing, and other states.

The phrase "representational state transfer (REST)" and the term "RESTful" as used herein refer to a distributed software client-server architecture model that manages requests and responses from servers, gateways, etc. A REST message typically confers state information. A RESTful message generally means conforming to the rules and architectural guidelines of REST.

The phrase "event state compositor" as used herein refers to the ability of a communication server or other server's processor to query for, accept, record, and publish the state of devices.

The term "subscription" as used herein should be understood to refer to an agreement to receive or be given access to services, updates, and data in more than one instance.

The term "resource" as used herein should be understood to refer to anything connected to a computer system. A resource can be virtual (software, files, memory) or physical (devices, components), and has limited availability.

The term "JGroup" as used herein should be understood to refer to a Java open source library, used to link applications together with a customizable networking fabric for unicast and multicast communication. This transport protocol internal grouping can be used across a LAN or a WAN, and allows for dynamic node discovery, multipoint and point-to-point communication, and the use of other grouping features and algorithms.

The phrase "Quality of Service (QoS)" as used herein should be understood to refer to a set of parameters that allow the transport of traffic with special requirements. Quality of service comprises requirements on all aspects of a connection, such as service response time, loss, signal-to-noise ratio, cross-talk, echo, interrupts, frequency response, loudness levels, data quality, delivery times, etc.

Furthermore, the term "server" as used herein should be understood to include any server, collection of servers, processors within a server, blades within a server, one or more virtual machines being executed by a server, containers or processes being executed by a server, etc. In other words, "servers" are not necessarily limited to individual hardware components with dedicated processors and memory. "Servers" are also not limited to a particular type of container executed by a server, such as a J2EE server or any other version of a Java EE server. Non-limiting examples of containers that may be executed by or constitute a server include application containers (e.g., Java Virtual Machines), applet containers (e.g., web browsers or applet viewers), Enterprise JavaBeans (EJB) containers, web containers, a software process exposing an Application Programming Interface (API), and the like.

The term "Hypertext Transfer Protocol" (HTTP) as used herein refers to an application protocol for distributed, collaborative, hypermedia information systems. HTTP is the foundation of data communication for the World Wide Web, coordinated by the Internet Engineering Task Force (IETF) and the World Wide Web Consortium (W3C). Hypertext is a multi-linear set of objects, building a network by using logical links (the so-called hyperlinks) between the nodes (e.g. text or words). HTTP is the protocol to exchange or transfer hypertext.

The term "SIP" as used herein refers to Session Initiation Protocol. SIP is as described in RFC 3261, dated June 2002, by Rosenberg et al., available from the Internet Engineering Task Force (IETF); this document and all other documents (e.g., RFC 3264, RFC 3265, RFC 4566, RFC 4660, RFC 4661, etc.) from the IETF describing SIP are herein incorporated by reference in their entirety for all that they teach. The embodiments may use SIP or other protocols to accomplish the processes described herein.

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

Additional features and advantages of embodiments of the present invention will become more readily apparent from the following description, particularly when taken together with the accompanying drawings.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
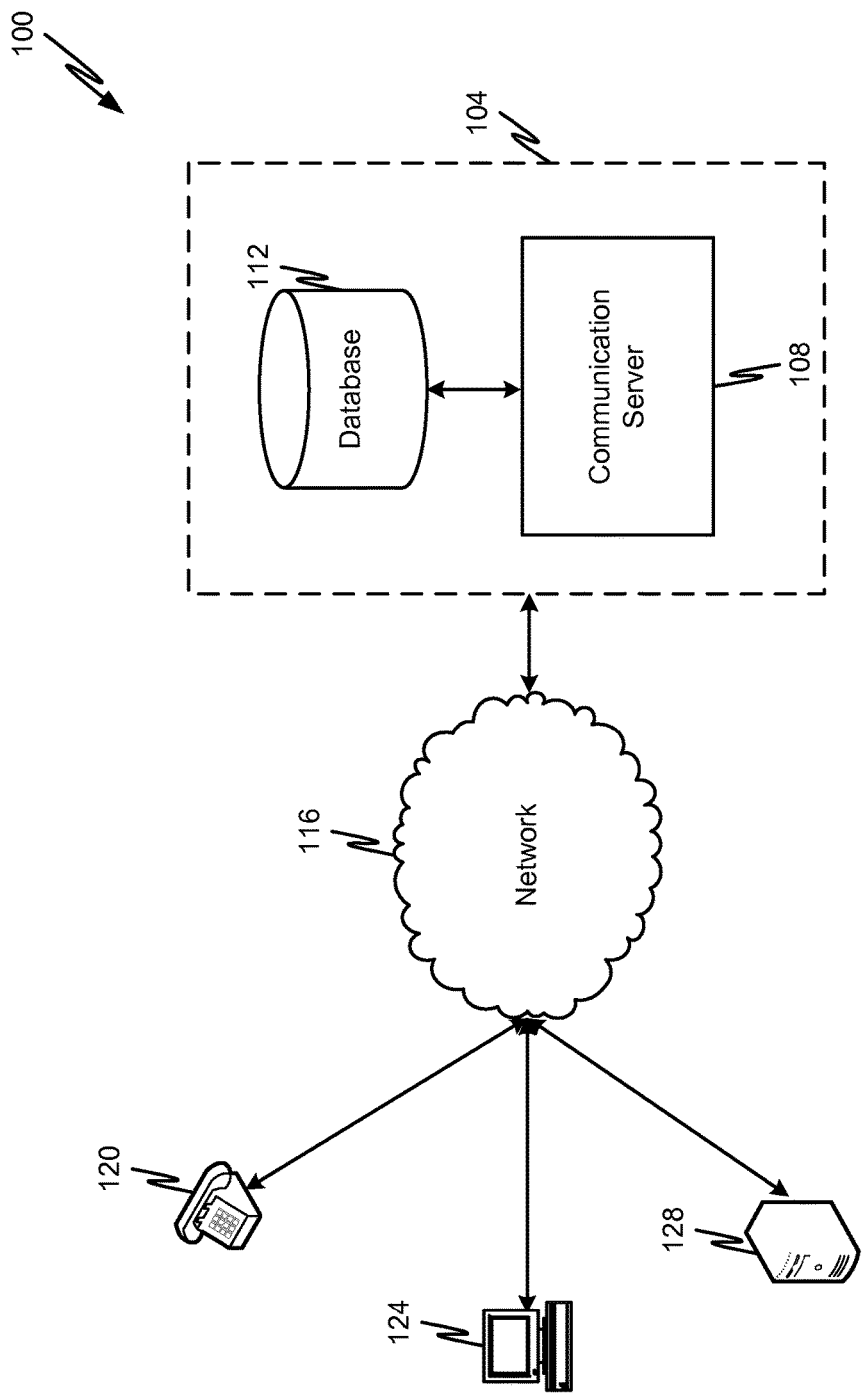
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprise one or more communication networks 116 that facilitate communications among the various devices and elements of the overall system including a User Information Service 104. The User Information Service 104 may comprise one of at least a communication server 108 and a database 112. The User Information Service may be accessed by one or more communication devices, including but not limited to user devices 120, applications on computers 124, servers 128, and/or applications residing on any of the communication devices.

The communication network 116 may include one or more enterprise communication networks and may be packet-switched and/or circuit-switched. An illustrative communication network 116 includes, without limitation, a Wide Area Network (WAN), such as the Internet, a Local Area Network (LAN), a Personal Area Network (PAN), a Public Switched Telephone Network (PSTN), a Plain Old Telephone Service (POTS) network, a cellular communications network, an IP Multimedia Subsystem (IMS) network, a Voice over IP (VoIP) network, a SIP network, or combinations thereof. In one configuration, the communication network 116 is a public network supporting the TCP/IP suite of protocols. Communications supported by the communication network 116 include real-time, near-real-time, and non-real-time communications. For instance, the communication network 116 may support voice, video, text, web conferencing, or any combination of media. Moreover, the communication network 116 may comprise a number of different communication media such as coaxial cable, copper cable/wire, fiber-optic cable, antennas for transmitting/receiving wireless messages, and combinations thereof. In addition, it can be appreciated that the communication network 116 need not be limited to any one network type, and instead may be comprised of a number of different networks and/or network types.

The communication network 116 may provide a location where one or more communication devices 120, 124, 128 and the User Information Service 104 can access, share, and/or use network services. Examples of services that may be offered by the User Information Service 104 via the communication network 116 include store-and-forward communication services, media services, data storage and retrieval services, processing services, application services, eventing services, combinations thereof, and any other automated or computer-implemented services, applications, or telephony features. In some embodiments, the communication network 116 may provide access to the User Information Service 104, whose services may be provided by a web module, server, or group of web servers.

The User Information Service 104 may be defined by metadata, including nodes, leaves, and attributes. The User Information Service 104 may provide one or more communication devices 120, 124, 128 with event notification. The event notification may prompt automatic action or alert a network that action needs to be taken. Applications on communication devices 120, 124, 128 may be operable to subscribe to changes in the database 112 using an optional filter. When data that meets filter requirements is updated, the applications may be notified of changes through eventing.

It should be appreciated that the User Information Service 104 may be distributed. Although embodiments of the present disclosure may refer to one or two User Information Services 104, it should be appreciated that the embodiments claimed herein are not so limited. For instance, multiple User Information Services may be joined by different servers and networks. Users may be associated with multiple instances of User Information Services 104 and may be connected through the communication network 116 to other user services, communication networks, enterprise networks, and companies.

In accordance with at least some embodiments of the present disclosure, the communication devices 120, 124, 128 may comprise any type of known communication equipment or collection of communication equipment. Examples of a suitable communication device 120, 124, 128 include, but are not limited to, a personal computer, laptop, tablet, Personal Digital Assistant (PDA), cellular phone, smartphone, telephone, server, or combinations thereof. In general, each communication device 120, 124, 128 may be adapted to support video, audio, text, applications, queries, subscriptions, and/or data communications with other communication devices 120, 124, 128 as well as the processing resources of the enterprise communication server 108. The type of medium used by the communication devices 120, 124, 128 to communicate with other communication devices 120, 124, 128 or processing resources of the enterprise communication server 108 may depend upon the communication applications and features available on the communication devices 120, 124, 128 and on the communication server 108.

Figure 2:
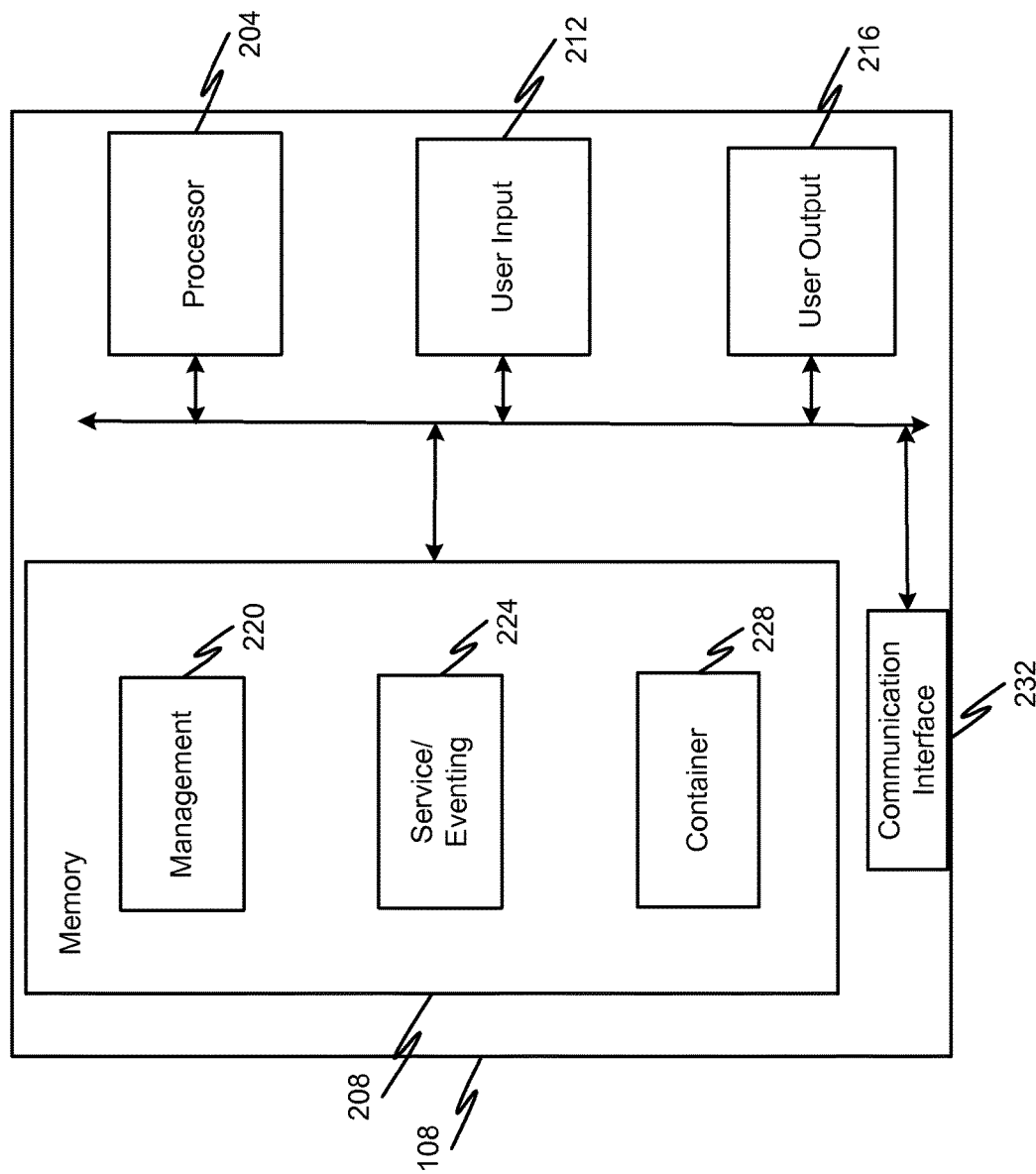
FIG. 2 is a block diagram depicting components of a communication server that are utilized in accordance with embodiments of the present disclosure.

FIG. 2 depicts an illustrative embodiment of a communication server 108 in accordance with at least some embodiments of the present disclosure. In some embodiments, the communication server 108 can include a processor 204 capable of executing program instructions. The processor 204 can include any general purpose programmable processor or controller for executing application programming. Alternatively, the processor 204 may comprise an application specific integrated circuit (ASIC). The processor 204 generally functions to run programming code implementing various functions performed by the associated server or device. The processor 204 of the communication server 108 can operate to collect and present event information from or to one or more communication devices 120, 124, 128 through execution of a management module 220, using the event dispatching and handling capabilities of a service/eventing module 224, and managing multi-protocol messages through a container module 228 while in communication with an internal or external database 112.

The communication server 108 additionally includes memory 208. The memory 208 can be used in connection with the execution of programming by the processor 204, and for the temporary or long term storage of data and/or program instructions. For example, the processor 204 in conjunction with the memory 208 of the communication server 108 can implement a multi-protocol eventing layer for an open source database through the communication server's modules 220, 224, 228. The communication server 108, in some embodiments, contains modules 220, 224, 228 within the memory 208 to support the implementation. The modules may run in concert or the modules may execute functions as discrete modules. The communication server 108 may include one or more of, but is not limited to, a management module 220, a service/eventing module 224, and a container module 228.

For example, the communication server 108 memory 208 can include software implementing the management module 220, the service/eventing module 224, and the container module 228 to provide access to and the capabilities of a multi-protocol eventing layer mechanism. The memory 208 of the communication server 108 or communication device 120, 124, 128 can include solid state memory that is resident, removable and/or remote in nature, such as DRAM and SDRAM. Moreover, the memory 208 can include a plurality of discrete components of different types and/or a plurality of logical partitions. In accordance with still other embodiments, the memory 208 comprises a non-transitory computer readable storage medium. Such a medium may take many forms, including but not limited to, non-volatile media, volatile media, and transmission media. Event notification may be provided for subscriptions with support from the modules 220, 224, 228. The service/eventing module 224 within the communication server 108 in conjunction with the processor 204 may communicate with an internal database 112. The database 112 may be external or internal to the communication server 108. The service/eventing module 224 is operable to receive requests, subscriptions, and event information from the communication device 120, 124, 128 that generated the request or reported the event. The event may be sent from the communication server 108 to the database 112. The management module 220 may present a graphical representation through a user interface.

The communication server 108 can also include or be connectable to user input devices 212 and user output devices 216. Such devices 212, 216 can be used in connection with the provisioning and operation of the communication server 108 and/or to allow users to access and control data entry, features, and applications resident on the communication server 108. Examples of user input devices 212 may include a keyboard, a numeric keypad, a touch screen, a microphone, a scanner, and a pointing device combined with a screen or other position encoder. Examples of user output devices 216 may include a display, a touch screen display, a monitor, an earpiece, a speaker, and a printer. The communication server 108 may also include a communication interface 232 to interconnect the components of the communication server 108 to the communication network 116 or any other type of network.

Figure 3A:
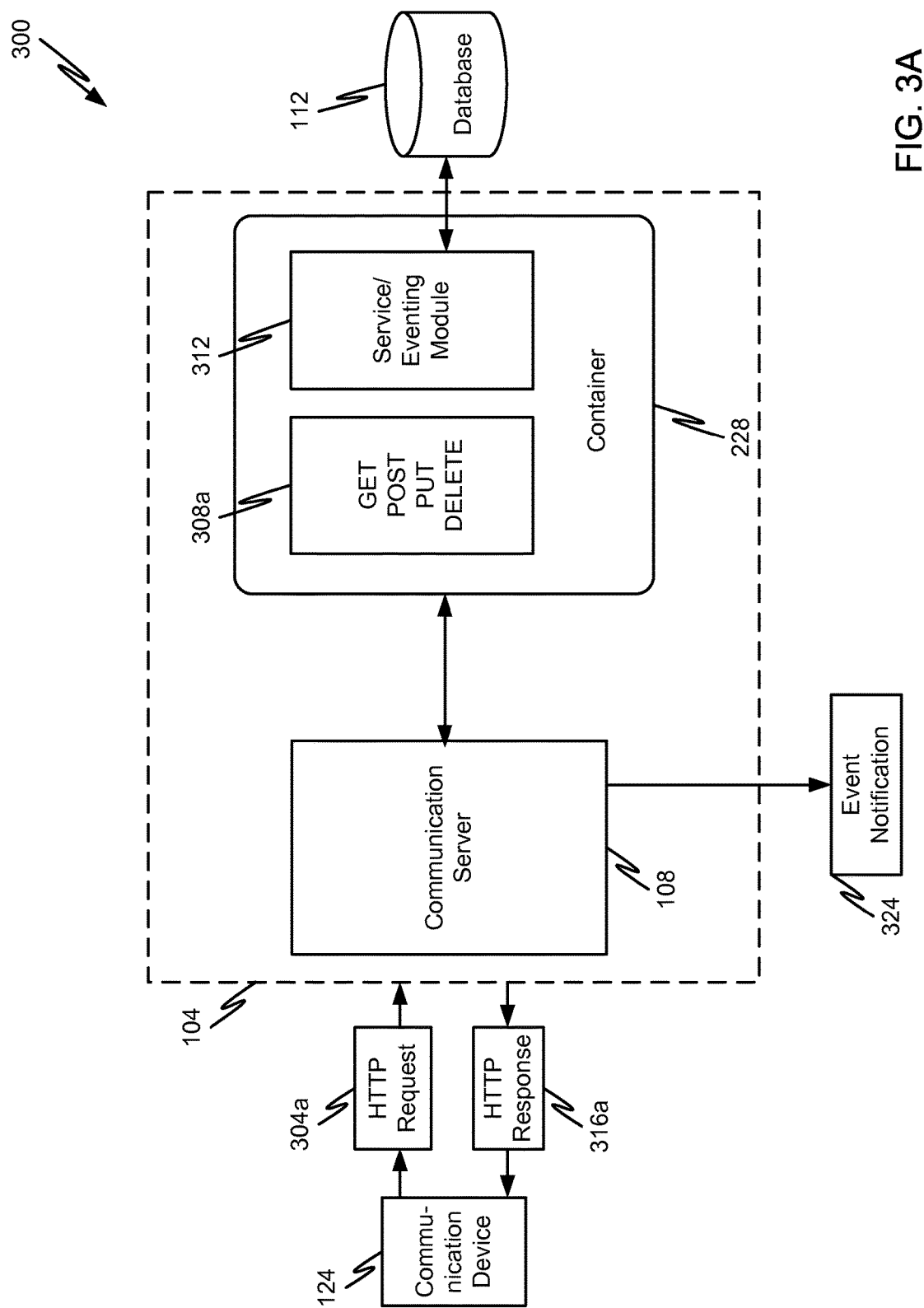
FIG. 3A is an example of an HTTP request in accordance with embodiments of the present disclosure.
Figure 3B:
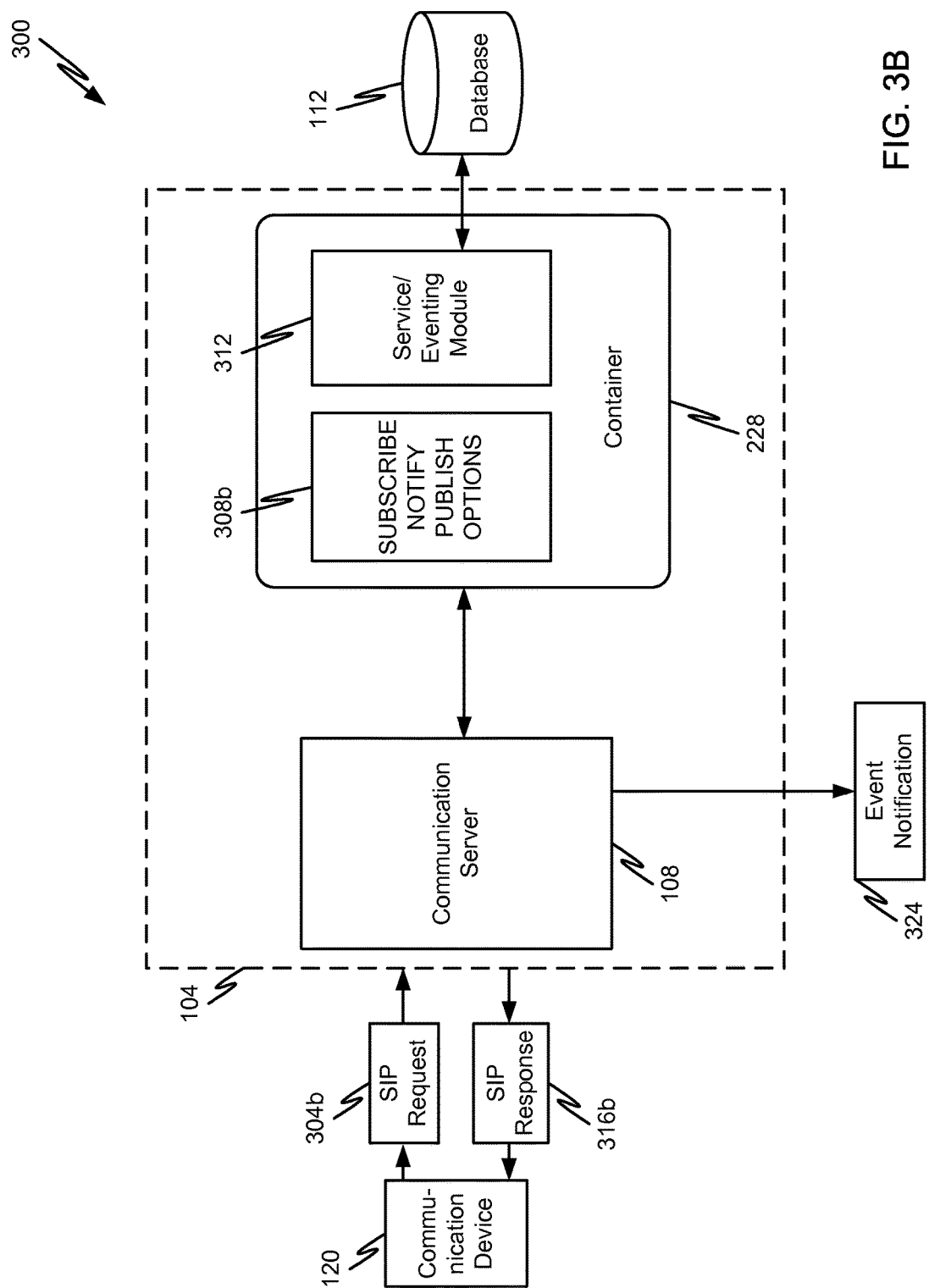
FIG. 3B is an example of an SIP request in accordance with embodiments of the present disclosure.

With reference now to FIGS. 3A and 3B, examples of multi-protocol requests, responses, and notifications will be described in accordance with embodiments of the present disclosure. Hereinafter, the examples and all aspects of the requests shall be explained with reference to the systems, components, modules, software, data structures, etc. described in conjunction with FIGS. 1-2. The various servers and components depicted in FIGS. 3A and 3B may be implemented separately (i.e., on different servers) or together (i.e., on a single server). In particular, two or more depicted components (e.g., communication server 108, database 112, container 228) may be implemented on a single server without departing from the scope of the present invention.

A communication server 108 may be operable to receive requests and subscriptions 304. The requests and subscriptions 304 can come from communication devices 120, 124, 128. Communications may be unidirectional or bidirectional based on the capabilities of the communication server 108 and communication devices 120, 124, 128. Protocols for the requests, for example, could include but are not limited to SIP, HTTP, and LDAP.

In embodiments, when a request or a subscription is received by the communication server 108, the subscription may be established. Accordingly, the subscription may be sent requesting user-specific information, and any related application or device will be alerted to the change in data. The eventing may alert multiple applications, including but not limited to HTTP and SIP-enabled applications on clients, web applications, and communication applications. A RESTful HTTP GET may be the notification mechanism if the query is in the HTTP protocol format, and a subscription may be the SIP notification mechanism for the query in the SIP protocol format. If the request or subscription was received using SIP, a SIP message may be returned after processing by a container 228. Following a request or subscription receipt and processing, the database 112 may be updated. In conjunction with the update, a filter may be applied, event messages may be generated, and information deltas may be included in the event notifications 324.

FIG. 3A is a diagram depicting an example of an HTTP request which may be generated by communication device 124 in accordance with embodiments of the present disclosure. The communication device 124 may send an HTTP request 304a to a communication server 108 within the User Information Service 104. This request may be in the form of but not limited to a new data entry, a change/add/delete, or other query, for example. The communication server 108 through the use of the modules, including the management module 220, the servicing/eventing module 224, and the container module 228 is operable to receive the HTTP request 304a. The request may include HTTP method messages 308a like GET, POST, PUT, and DELETE as described in RFC 2616, Hypertext Transfer Protocol—HTTP 1.1, the contents of which are incorporated herein by reference in their entirety. Other methods not discussed here that may be used include HEAD, TRACE, and CONNECT, and other HTTP messages/methods.

A GET message 308a may be a data retrieval message that says "give me this resource." The request line may have three segments, including a method (e.g., GET), a local path (e.g., /path/to/file/index.html), and an HTTP version (e.g., HTTP/1.1). A typical response to a GET message 308a might include either an answer in the affirmative (HTTP/1.1 200 OK) or in the negative (HTTP/1.0 404 Not Found). A POST message 308a may be a request that includes a resource to the communication server 108 that says "process this data." A POST message 308a typically has five segments, including a POST location (e.g., /path/to/file/index.html HTTP/1.1), a Host (e.g., server.com), Content-Type that sends metadata that may tell the communication server 108 the type of data in the body (e.g., application), Content Length which may indicate to the communication server 108 how much to read, typically in the form of a number (e.g., 19), and user credentials. A POST request 308a might be employed when adding new users/contacts, each including a name, an address, and contact details. A PUT message 308a uploads a representation of a resource which may be a modification or a new resource and says "process this data." The PUT message 308a may be used if a request may be submitted several times with an identical result, like adding a user. The PUT message 308a may be very similar in structure to a POST message 308a. A DELETE message 308a may request that a resource be removed. A DELETE message 308a typically shows a location (e.g., /path/to/file/index.html).

Each of these HTTP request methods may be used by the multi-protocol eventing layer to add/modify/delete information in the database 112, which may, for example, be a Cassandra database or other open source database. The GET, POST, PUT, and DELETE messages 308a may be requests to change information in the database 112. Optionally, HTTP may support session-based eventing using long-polling or web sockets. As the information is changed, the database 112 may be updated, a filter may be applied, and an event from the service/eventing module 312 describing the change may be returned to the communication server 108 and returned to the communication device 124 in an HTTP Response 316a. In addition, the changed information may be pushed to all interested subscribers through event notification 324 via the protocol used when the subscription was established.

FIG. 3B is a diagram depicting an example of an SIP request which may be generated by communication device 120 in accordance with embodiments of the present disclosure. The communication device 120 may send a SIP request 304b to a communication server 108. This request may be in the form of but not limited to a new data entry, a change/add/delete, subscription, or other query or modification request, for example. The communication server 108 through the use of the modules, including the management module 220, the servicing/eventing module 224, and the container module 228 is operable to receive the SIP request 304b. The request 304b may include SIP event messages like SUBSCRIBE, NOTIFY, PUBLISH, and OPTIONS as described in RFCs 3261 and 3265, SIP: Session Initiation Protocol—SIP-Specific Event Notification, the contents of which are incorporated herein by reference in their entirety.

A SUBSCRIBE message 308b may be a persistent or a one-time request for an event notification from the network communication server 108 (e.g., SUBSCRIBE sip: address@domain.com SIP/2.0, event or resource type). A NOTIFY message 308b may alert a subscriber to a change. The NOTIFY message 308b may contain information about an event or state of a resource based on an existing subscription, including an 'expires' header and a 'subscription state' header. A PUBLISH message 308b may be used to inform the network communication server 108 of resource states or to notify the network communication server 108 of an event (e.g., PUBLISH sip:address@domain.com SIP/2.0, event). An OPTIONS message 308b may be used to ask the communication server 108 what it can do (e.g., request OPTIONS https://www.server.com/api/v1/optionsets.xml). An OPTIONS message may be a query to determine capabilities of the communication server 108.

Each of these SIP event methods and messages may be used by the multi-protocol eventing layer to add/modify/delete information in the database 112, which may, for example, be a Cassandra database or other open source database. The SUBSCRIBE, NOTIFY, PUBLISH, and OPTIONS messages 308b may be requests to change information in the database 112. As the information is changed, the database 112 may be updated, a filter may be applied, and a SIP response message 316b describing the change may be returned to the communication device 120. In addition, the changed information may be pushed to all interested subscribers through event notification 324 via the protocol that they used when they subscribed for information updates.

Figure 4:
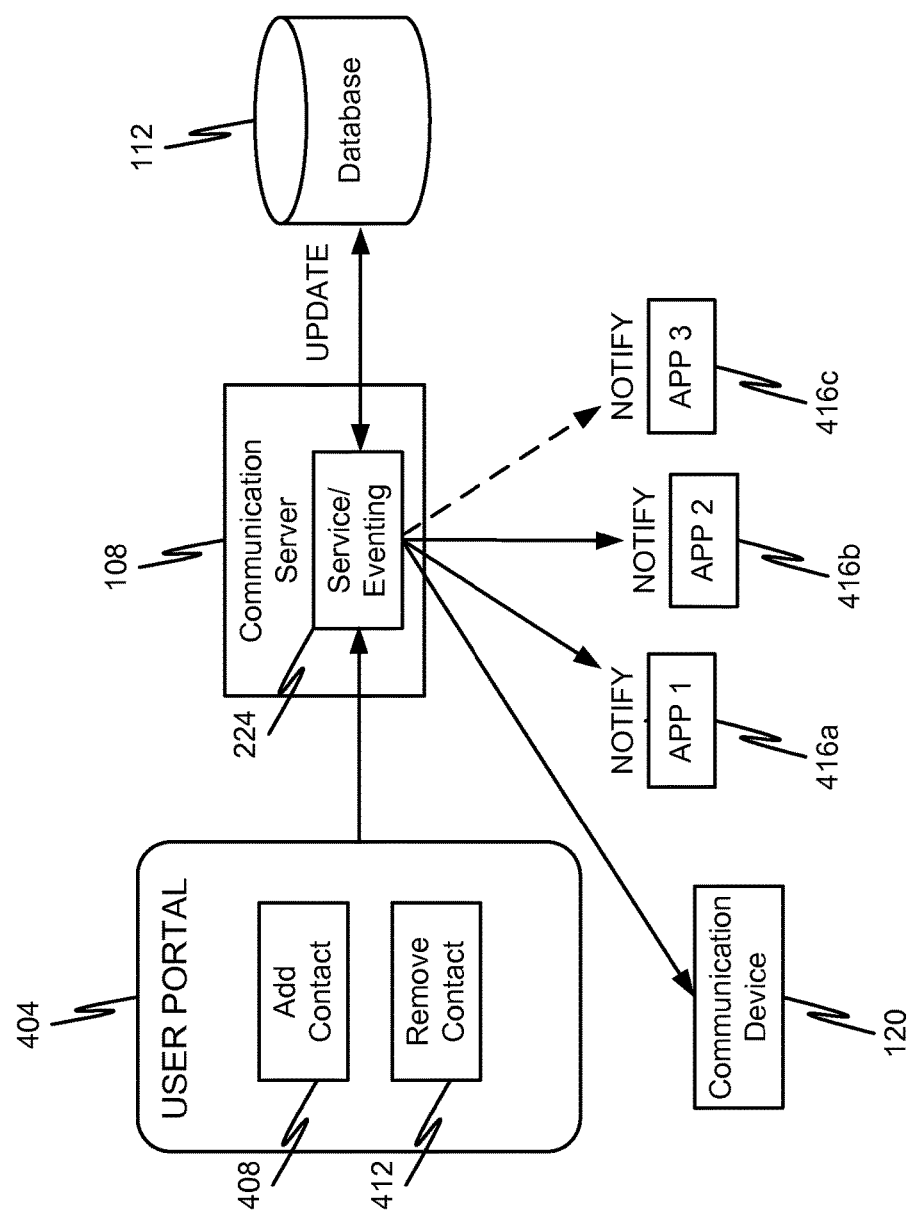
FIG. 4 is a user interface depicting a method propagating an update in accordance with embodiments of the present disclosure.

FIG. 4 is a diagram depicting an example 400 of a request which may be generated by communication devices 120, 124, 128 in accordance with embodiments of the present disclosure. Hereinafter, FIG. 4 shall be explained with reference to the systems, components, modules, software, data structures, etc. described in conjunction with FIGS. 1-3B.

A communication server 108 service/eventing module 224 and a database 112 may receive requests in the form of queries and/or subscriptions. The requests can come from communication devices 120, 124, 128, including a user portal interface 404. Communications may be unidirectional or bidirectional based on the capabilities of the communication server 108 and the communication devices 120, 124, 128, and the user portal interface 404. Protocols that might be used for the requests, for example, could include SIP, HTTP, LDAP, variants thereof, enhancements thereto, or combinations thereof. If the request is in the form of a change, the change could be to add a contact 408 or to remove a contact 412, for example. The request may trigger the service/eventing module 224 to send the change to the database 112 and create an event notification. Once written to the database 112, the change, which may be user data or other information, may be sent to any communication devices 120, 124, 128 that have subscribed to receive event notification.

For example, a user may come into his or her office and access a browser. The browser may give the user a user interface (UI) 404 to the multi-protocol eventing system. Within the user's UI or portal 404, the user may have options including but not limited to "Add Contact" and "Remove Contact." When the user chooses the "Remove Contact" button and clicks on it, the portal 404 may send a REST message to the service/eventing module 224 inside of the communication server 108. The service/eventing module 224 inside of the communication server 108 may update one or more fields in a database 112. If there are no active subscriptions for the user, nothing happens. If there is an active subscription for the user on the communication server 108, the service/eventing module 224 may apply a filter. If the filter matches, the service/eventing module 224 may determine the change, or delta, and ask the communication server 108 to send out a NOTIFY message. The typical SUBSCRIBE and NOTIFY messages are described in Request for Comment (RFC) 3265, the contents of which are herein incorporated by reference in their entirety for all that they teach. The NOTIFY contains the difference in the data which may be delivered to one or more applications 416a-c as well as returned to the user portal 404. Additionally, event notification may be provided to other communication devices 120, as appropriate.

Figure 5:
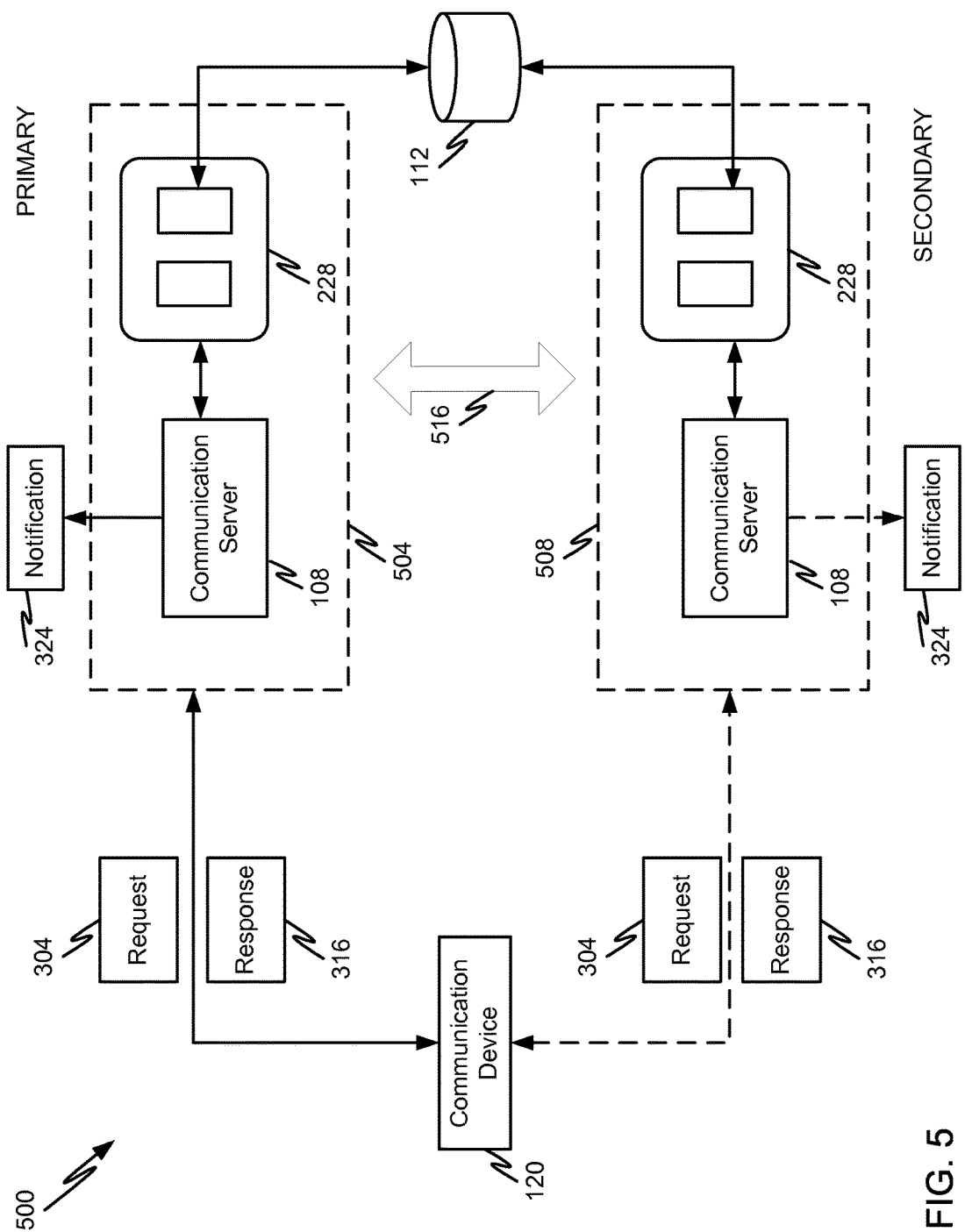
FIG. 5 is an example of a communication between primary and secondary systems in accordance with embodiments of the present disclosure.

FIG. 5 is a diagram depicting an example of communication between an end user and a primary and secondary User Information Services system in accordance with embodiments of the present disclosure. Hereinafter, FIG. 5 shall be explained with reference to the systems, components, modules, software, data structures, etc. described in conjunction with FIGS. 1-4.

A primary and a secondary User Information Services system 504, 508 may be components of a High Availability (HA) configuration. HA typically refers to a design that allows for continuous operation, even in the event of a device failure. For example, if there are ten User Information Services systems that service one hundred users, the user load may be distributed in part on each of the User Information Services systems. Users 1-9 may be serviced by User Information Services system 1. User 1 may be backed up on User Information Services system 2. User 2 may be backed up on User Information Services system 3, and so on. Each user in the HA configuration may be serviced by a primary User Information Services system 504 and a secondary User Information Services system 508. If the primary User Information Services system 504 is taken out of operation for maintenance or is unavailable for other reasons, the secondary User Information Services system 508 knows about subscriptions and event notification 324 and may be operable to handle changes and event messaging during downtime.

In the illustrative example, the secondary User Information Services system 508 knows about subscriptions through a distributed state sharing mechanism on the primary User Information Services system 504, and may be operable to handle requests 304 if the primary User Information Services system 504 experiences a failure. A message bus 516 may be used between the primary User Information Services system 504 and the secondary User Information Services system 508 (e.g., JGroups and/or other reliable unicast and multicast message transmission systems). The message bus 516 may be a combination of a messaging infrastructure, a common command set, and a common data model. The primary User Information Services system 504 and the secondary User Information Services system 508 use the message bus 516 to transport messages between the systems and any resident applications. The message bus 516 may allow the primary User Information Services system 504 and the secondary User Information Services system 508 to work in an active-active state with joint responsibility to provide notifications to subscribers. Communication devices 120 may be operable to subscribe to the primary User Information Services system 504 and the secondary User Information Services system 508 to receive event notification 512 when one system fails.

For example, a communication device 120 may send a request 304 to the primary User Information Services system 504 communication server 108. This request may be in the form of but not limited to a new data entry, a change/add/delete, or other query, for example. The communication server 108 through the use of the modules, including the management module 220, the servicing/eventing module 224, and the container module 228 is typically operable to receive the request 304. If the primary User Information Services system 504 is not operable or available to manage the request 304, provide a response 316, and event notification 324, a secondary User Information Services system 508 may be operable and available to manage the request 304 and provide alternate event notification 324. Once the primary User Information Services system 504 is again operable and available, the management and eventing responsibilities for configured communication devices 120 may be relinquished by the secondary User Information Services system 508 and returned to the primary User Information Services system 504.

Figure 6:
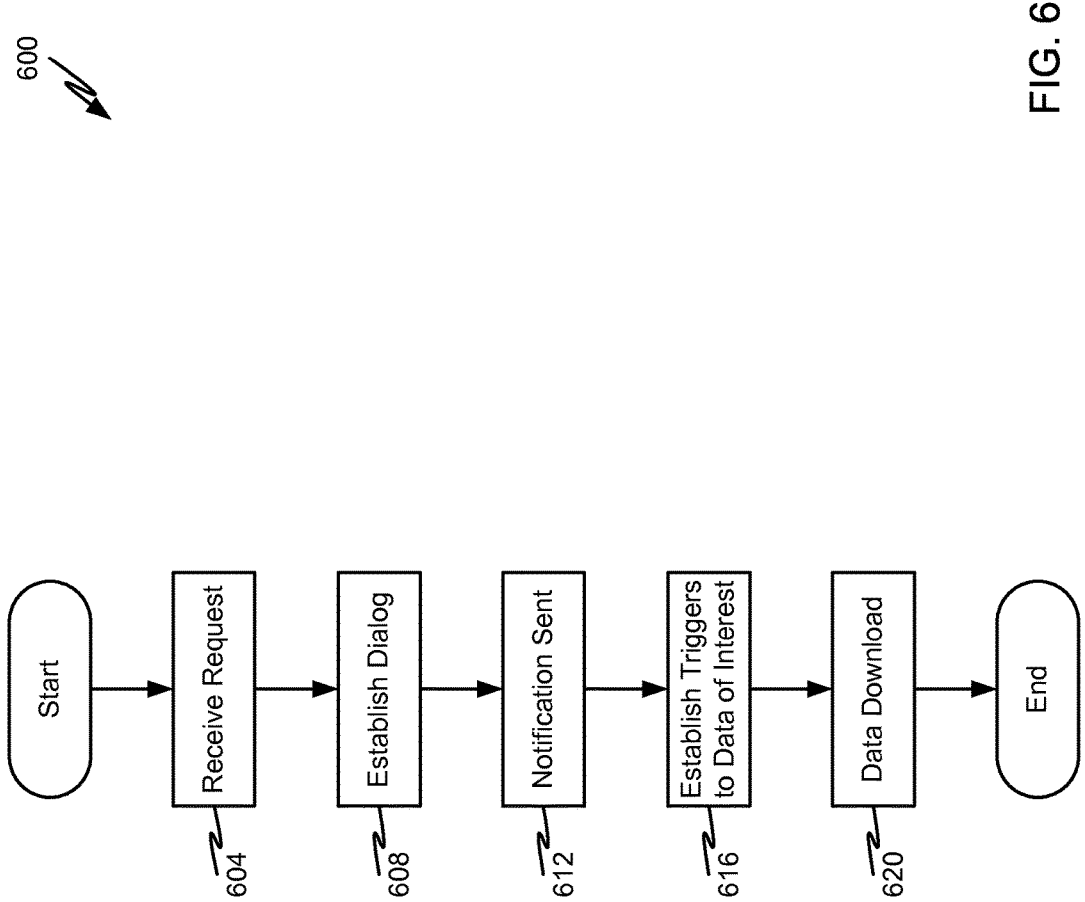
FIG. 6 is a flowchart depicting a method for establishing a subscription in accordance with embodiments of the present disclosure.

With reference now to FIG. 6, aspects of a method of eventing in accordance with embodiments of the present disclosure are depicted. Generally, the method 600 begins with a start operation and ends with an end operation. While a general order for the steps of the method 600 are shown in FIG. 6, the method 600 can include more or fewer steps or the order of the steps can be arranged differently than those shown in FIG. 6. The method 600 can be executed as a set of computer-executable instructions executed by a computer system and encoded or stored on a non-transitory computer readable medium. Hereinafter, the method 600 shall be explained with reference to the systems, components, modules, software, data structures, etc. described in conjunction with FIGS. 1-5.

Generally, the method begins with receipt of a request sent from a communication device 120, 124, 128, in step 604, to a User Information Service 104. As an example, the request may be in the form of a SIP SUBSCRIBE message. A SIP SUBSCRIBE message typically asks another entity to send event change notifications. The event change notification is typically in the form of a SIP NOTIFY message. Other protocols may be similarly used. The eventing layer that front-ends the database may be common among protocols, for example between the HTTP and the SIP API Servlets, to minimize the window of time where data has been changed but is not yet seen as changed. In step 608, a dialog may be established based on the SIP SUBSCRIBE message received by the communication server 108 within the User Information Service 104. The SIP SUBSCRIBE message may be received and processed by the service/eventing module 224 of the communication server 108. The SIP SUBSCRIBE message may be sent to the container 228 for processing in real time. The management module 220 may receive a request from the multi-protocol capable container 228 to establish a subscription through a dialog, in step 608. In step 612, an initial event notification may be sent from the multi-protocol capable container 228 to the communication server 108 and to a communication device 120, 124, 128 providing the current state of the requested resource. Triggers to the data of interest may be established, in step 616. Once the triggers are established, every time an event takes place that alters the data of interest, the data may be downloaded and subsequent event notifications may be sent to the communication server 108 and to the communication device 120, as well as all other devices 120 that have previously subscribed to the resource of interest in step 620. The event notifications 324 may contain the newly updated data, or alternatively may contain an accessor method which can be used to obtain the changed data should the size of the data become too large to be contained practically in a single notification event.

Figure 7:
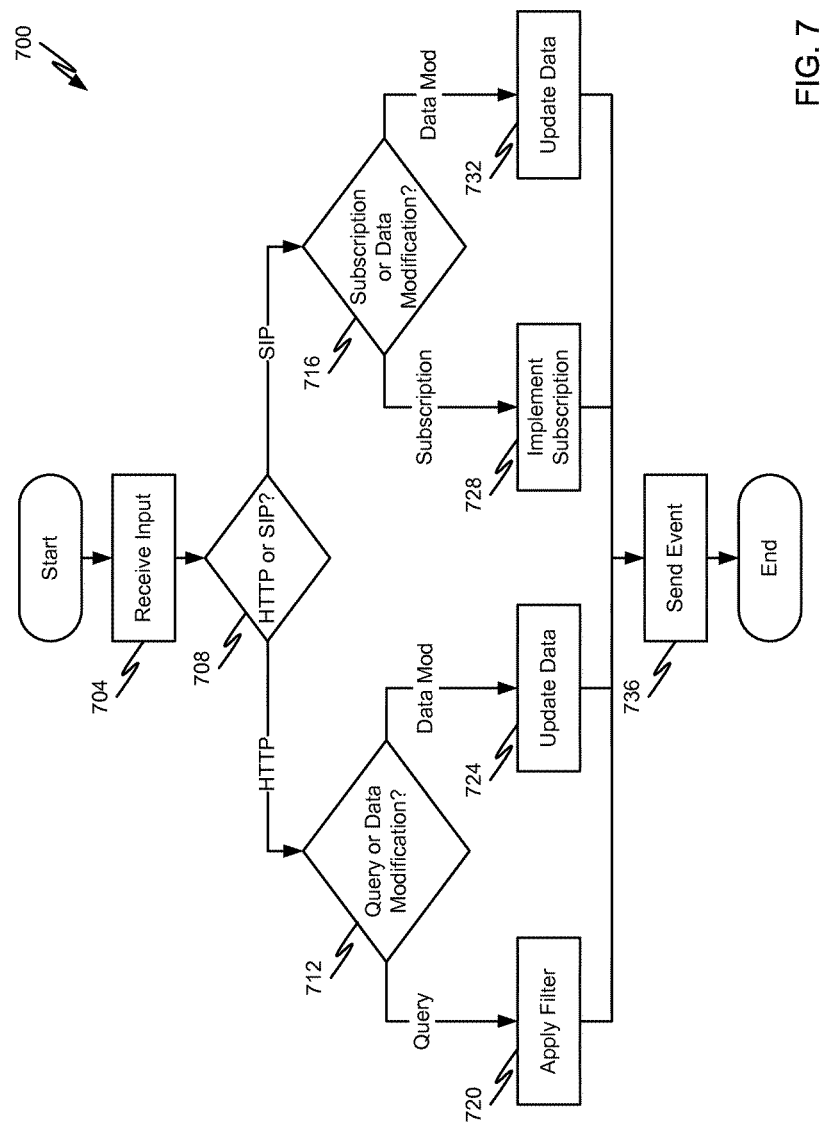
FIG. 7 is a flowchart depicting a method for information publication, storage, retrieval, and eventing from a data system with a multi-protocol eventing layer in accordance with embodiments of the present disclosure.

With reference now to FIG. 7, aspects of a method for information publication, storage, retrieval, and eventing from a data system with a multi-protocol eventing layer are depicted in accordance with embodiments of the present disclosure. Generally, the method 700 begins with a start operation and ends with an end operation. While a general order for the steps of the method 700 are shown in FIG. 7, the method 700 can include more or fewer steps or the order of the steps can be arranged differently than those shown in FIG. 7. The method 700 can be executed as a set of computer-executable instructions executed by a computer system and encoded or stored on a non-transitory computer readable medium. Hereinafter, the method 700 shall be explained with reference to the systems, components, modules, software, data structures, etc. described in conjunction with FIGS. 1-6.

Generally, the method begins with a request sent from a communication device 120, 124, 128 which may be received by a User Information Service 104, in step 704. At step 708, a determination may be made as to whether the request from step 704 is a SIP request or an HTTP request. For the protocol decision step 708, HTTP and SIP may be considered representative examples, but other read and write protocols could alternatively be used for this step. The process continues with steps 712 if the protocol is HTTP and 716 if the protocol is SIP.

For HTTP, step 712 may pose the question as to whether the input is a query or a request for data modification or schema modification. For SIP, step 716 may pose the question as to whether the input is for a subscription or a request for data modification or schema modification. A RESTful HTTP GET is a common mechanism if the query is in the HTTP protocol format. A subscription is a common SIP mechanism for the query. If it is determined in step 712 that the request type was a query, the communication server 108 may apply a filter based on the HTTP input, in step 720. If data modification or schema modification is included in the HTTP request, the management module 220 of the communication server 108 may update the data or the schema with a write or provide updates, per the request, in step 724. In the case of SIP input in step 716, the communication server 108 management module 220 may implement a subscription based on the request, in step 728. If data modification or schema modification is included in the SIP request, the management module 220 may update the data or schema with a write or provide updates per the request, in step 732.

In step 736, an event message may be returned to the communication device 120, 124, 128 that made the initial request. Notifications may be returned to the communication device 120, 124, 128 that made the initial request to the User Information Service 104 and notifications may additionally be sent to communication devices 120, 124, 128 with active subscriptions. Once the request has been satisfied and event messages and notifications are completed, the process ends. It should also be noted that the event information may be sent back to the appropriate communication device 120, 124, 128 in a format consistent or compatible with the format that was used to generate the initial request.

As can be appreciated by one of skill in the art after consideration of the present disclosure, the provision of an elegant and efficient multi-protocol eventing layer including a container capable of handling multiple types of protocols to manage events for a Cassandra or other open source database provides robust and consistent universal access for all network elements. Therefore, by providing multi-protocol eventing, systems and methods as disclosed herein can deliver efficiencies of data, time, and event notification, as well as increase user and administrator satisfaction.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Also, it is noted that the embodiments were described as a process which is depicted as a flowchart, a flow diagram, a data flow diagram, a user interface, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Additionally, protocols that might be used for requests including SIP, HTTP, LDAP, or other protocols may be used in conjunction with the embodiments. The protocols used in this application are intended as representative examples only. Other protocols may be used in conjunction with or in place of any of the protocol examples.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
   receiving, by a processor, at a multi-protocol eventing layer, a change request from a first communication device, the change request comprising a request to change a database, the multi-protocol eventing layer comprising a front end of the database, wherein the database comprises an open source, NoSQL database and wherein the change request is one of a plurality of change requests, the plurality of change requests comprising both HyperText Transfer Protocol (HTTP) requests and Session Initiation Protocol (SIP) requests;
   sending, by the processor, the change request to a converged container of the multi-protocol eventing layer;
   processing the change request, by the converged container of the multi-protocol eventing layer, to enable event updates at the system to be provided to the first communication device and a second communication device in accordance with the change request; and
   creating an event notification of the multi-protocol eventing layer, the event notification corresponding to the satisfaction of the change request.

2. The method of claim 1, further comprising:
   determining that a change in the system has occurred, the change in the system satisfying the change request; and
   providing an event notification to the first communication device and the second communication device to describe the change.

3. The method of claim 2, wherein the change corresponds to modification of data from a database.

4. The method of claim 3, wherein the database comprises a Cassandra database.

5. The method of claim 1, wherein processing the HTTP request results in a query and processing the SIP request results in a subscription.

6. The method of claim 5, wherein the converged container comprises a converged JSR 289 container and wherein the event notification is created at an application programming interface layer.

7. The method of claim 1, wherein the first communication device comprises a user device and the second communication device comprises a user device.

8. The method of claim 1, wherein the change request results in the creation of a database filter that satisfies the change request.

9. A communication system, comprising:
   a communication server;
   an eventing module in communication with the communication server and providing a front end to a database, a processor executing the eventing module being programmed to receive a change request from a first communication device, the change request comprising a request to change the database, wherein the database comprises an open source, NoSQL database wherein the change request comprises one of a plurality of change requests the plurality of change requests comprising both HyperText Transfer Protocol (HTTP) requests and Session Initiation Protocol (SIP) requests, wherein the processor executing the eventing module is further programmed to distinguish between a change request in HTTP format and SIP format, wherein the processor executing the eventing module is further programmed to process the change request in HTTP and SIP formats, and wherein the eventing module is further programmed to:
   send the change request to a converged container;
   process the change request, by the converged container, to enable event updates at the system to be provided to the first communication device and a second communication device in accordance with the change request;
   determine that a change in the system has occurred, the change in the system satisfying the change request;
   create one or more event notifications, the event notifications corresponding to the satisfaction of the change request; and
   provide the event notification to the first communication device and the second communication device to describe the change.

10. The system of claim 9, wherein the change corresponds to a modification of data from a database.

11. The system of claim 9, wherein the database comprises a Cassandra database.

12. The system of claim 9, wherein the system processes the HTTP request resulting in a query and the system processes the SIP request resulting in a subscription.

13. The system of claim 9, wherein the converged container comprises a converged JSR 289 container and wherein the event notification is created at an application programming interface layer.

14. The system of claim 9, wherein the first communication device comprises a user device and the second communication device comprises a user device.

15. A communication server in communication with a database, the communication server comprising:
   memory;
   a processor;
   a management module;
   an eventing module that receives a change request from a first communication device, wherein the change request comprises a request to change the database, wherein the database comprises an open source, NoSQL database wherein the eventing module comprises a front end of the database, wherein the change request is one of a plurality of change requests, the plurality of change requests comprising both HyperText Transfer Protocol (HTTP) requests and Session Initiation Protocol (SIP)

requests and wherein the eventing module is further programmed to process the change requests in HTTP and SIP formats;
a container module;
a user input, wherein the user input receives a change request from a first communication device;
a user output; and
a communication interface.

16. The communication server of claim 15, wherein the wherein the HTTP change request results in a query and the SIP request results in a subscription.

17. The communication server of claim 15, wherein the database comprises a Cassandra database.

18. The communication server of claim 15, wherein the converged container comprises a converged JSR 289 container and wherein the event notification is created at an application programming interface layer.

19. The communication server of claim 15, wherein the change request results in creating a database filter that satisfies the change request.

20. The communication server of claim 15, wherein the communication server is in communication with a secondary communication server via a message bus, and wherein the message bus transports messages between the communication server and the secondary communication server.

* * * * *